Oct. 5, 1937.  C. E. DAWSON  2,094,915
BROILER
Filed Feb. 12, 1936
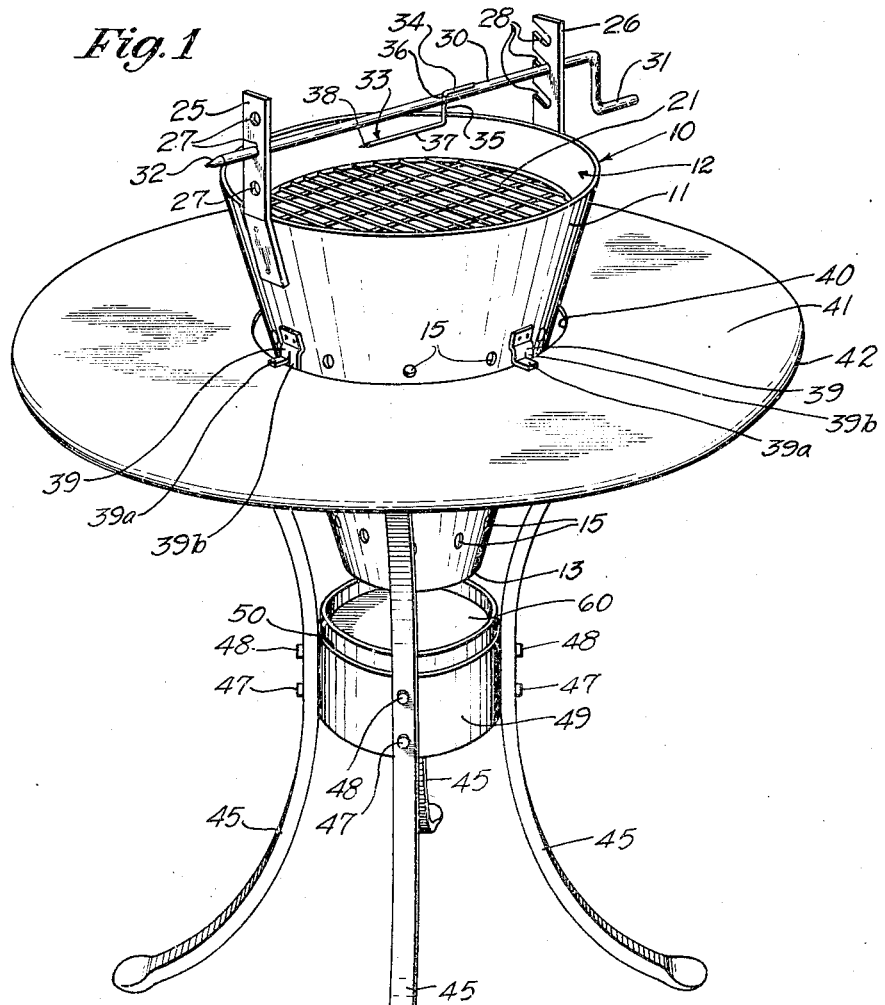
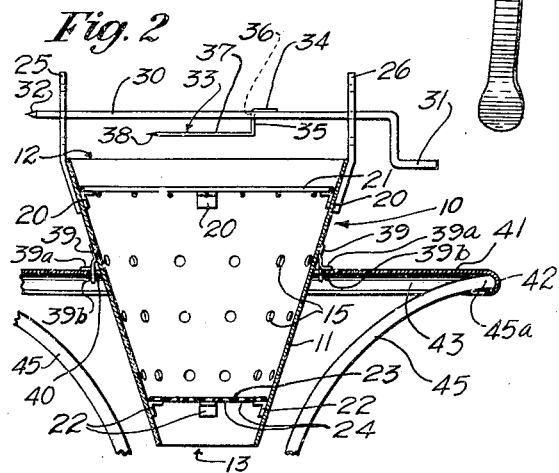
*Inventor*
*Charles E. Dawson.*
*Attorney.*

Patented Oct. 5, 1937

2,094,915

UNITED STATES PATENT OFFICE 2,094,915

BROILER

Charles E. Dawson, Los Angeles, Calif., assignor to Kittle Manufacturing Company, Los Angeles, Calif., a co-partnership consisting of John P. Meehan, Rose B. Meehan, and Grace K. Leonard Application February 12, 1936, Serial No. 63,519

2 Claims. (Cl. 126—29)

My invention relates to broiling devices, and, in its more particular aspects, has to do with portable and easily assembled broilers.

Among the objects of my invention I aim to provide a portable broiler or barbecuing device particularly adaptable for outdoor use such, for instance, as upon the lawn of a home; and one which provides, in a compact assembly, a fire pot, a grill, a spit rod, an ash receptacle and a surrounding table. A further object is to provide a device of this character in which the parts can be readily assembled and one which is simple and economical of construction.

The invention consists of the novel parts and the combinations of parts now to be described, all of which go to produce a device which accomplishes the objects which I have enumerated as well as other objects which will become obvious from the detailed description of a preferred embodiment which I shall now give.

In the drawing, to which I shall now make reference and which, by way of example, illustrates a present preferred embodiment of my invention:

Fig. 1 is a view of my broiler in perspective; and

Fig. 2 is a vertical section of the broiler element, and showing a portion of the table broken away.

The numeral 10 designates the broiler element, here instanced as an inverted frustro conical metal fire pot 11 open at its top 12 and at its bottom 13 and having circumferentially and vertically spaced perforations 15 through its side wall to admit air to the fuel (not shown) within the pot.

Adjacent the top open end 12 of the pot and removably mounted upon a plurality of brackets 20 (preferably four in number) is a grill 21 which is preferably composed of crossed bars or suitable wire mesh. Adjacent open bottom end 13 of the pot and removably mounted upon brackets 22 (also preferably four in number) is a bottom plate 23 upon which the fuel, such as charcoal, rests during operation. Plate 23 has a plurality of perforations 24 to admit air to the fire pot from below. While brackets 20 and 22 may be affixed to the inner side wall of the pot in any suitable manner, I prefer to spot weld them thereto as shown.

Affixed to the fire pot, as by spot-welding, and projecting above its top end 12, I provide a pair of oppositely mounted upright members 25, 26 on which a spit rod 30 is mounted. So that the rod 30 may be adjustably positioned with respect to the fire pot, upright member 25 is provided with three vertically spaced holes 27, through either one of which one end of rod 30 projects, and member 26 is provided with three vertically spaced slots 28 in either one of which the other end of the rod rests. Spit 30 is provided with an operating handle 31 and a pointed opposite end 32 to facilitate insertion of the rod into an article to be broiled or barbecued. To prevent the article being broiled from rotating with respect to the spit, I provide a pin 33 comprised of a portion 34 affixed to the rod, a portion 35 extending at right angles to and through a hole 36 in the rod, and a portion 37 spaced from and extending parallel to the rod, one end 38 of this pin being pointed to facilitate its insertion into the article being cooked.

The fire pot is removably mounted in circular central opening 40 of a round table top 41, being supported and registered in position in the opening by a plurality of stops 39 riveted or otherwise affixed to the exterior wall of the fire pot, each stop having a finger 39a which rests on the table top and a finger 39b that fits in the table opening. These latter fingers space the fire pot from the table top, reducing the heat conduction to the table and keeping it relatively cool.

To provide a support for and a shelf surrounding the fire pot, I preferably utilize a table of the knock-down type—that is, one which may be readily assembled and disassembled and which, when disassembled, will occupy a minimum of storage space. By way of example, I show a table having a metal top 41 in the central opening 40 of which is mounted the fire pot as before described. Table top 41 is preferably round and has a peripheral flange 42 which is of concavo-convex form with the concave face 43 of the flange disposed inwardly to socket one end 45a of each of the curved legs 45. The portion midway between the end of each of the curved legs 45 is secured by vertically spaced bolts 47, 48 to a center drum 49, which drum has bolt-receiving holes in its sides and is closed at its top to provide a shelf for the ash pan 60. Thus when the lower bolt 47 is tightened up, the upper end 45a of the leg is forced outwardly into the socket provided by the peripheral flange 42 of the table top, the outer face of the drum 49 acting as a fulcrum.

The closed top of drum 49 acts as a shelf 50 upon which is removably mounted an ash pan 60 to collect any ashes that drop through perforations 24 in plate 23.

From the foregoing description it will be seen that I have provided a broiler which may be made and assembled with maximum economy and simplicity, and which is efficient in its operation and very durable. By mounting the fire pot in the opening of a table top spaced from the top-periphery, I provide an efficient shelf or table surface surrounding the fire pot which catches any grease or food particles which might otherwise fall to the lawn or floor upon which the device is being used, and the shelf surrounding the fire pot acts as a spacer to prevent the user from burning himself by leaning against the hot fire pot. The drum 40 and ash pan 60, aside from their above described functions, also serve to protect the lawn or other floor surface from heat reflected from the fire pot.

While in the foregoing description I have, by way of example, described specific details of structure and association of parts, I wish it understood that my invention, in its broader aspects, is not limited thereto, but is limited only as appears in the following claims.

I claim:

1. A cooking device including an upright fire pot having side walls, a horizontally disposed shelf around the fire pot, fingers secured to the side walls of the fire pot and cooperating with the shelf to hold the fire pot spaced from the shelf, and legs for supporting the fire pot and shelf in elevated position.

2. A cooking device including an upright fire pot having an open top, a perforated closure adjacent its bottom and a horizontally disposed annular shelf between its top and bottom portions, a plurality of legs for supporting the fire pot in elevated position, an ash receptacle and means carried by the legs for supporting the ash receptacle in position beneath the fire pot.

CHARLES E. DAWSON.